June 1, 1954
W. A. RAY
2,679,855
VALVE-SCAVENGING MEANS
Filed June 19, 1950
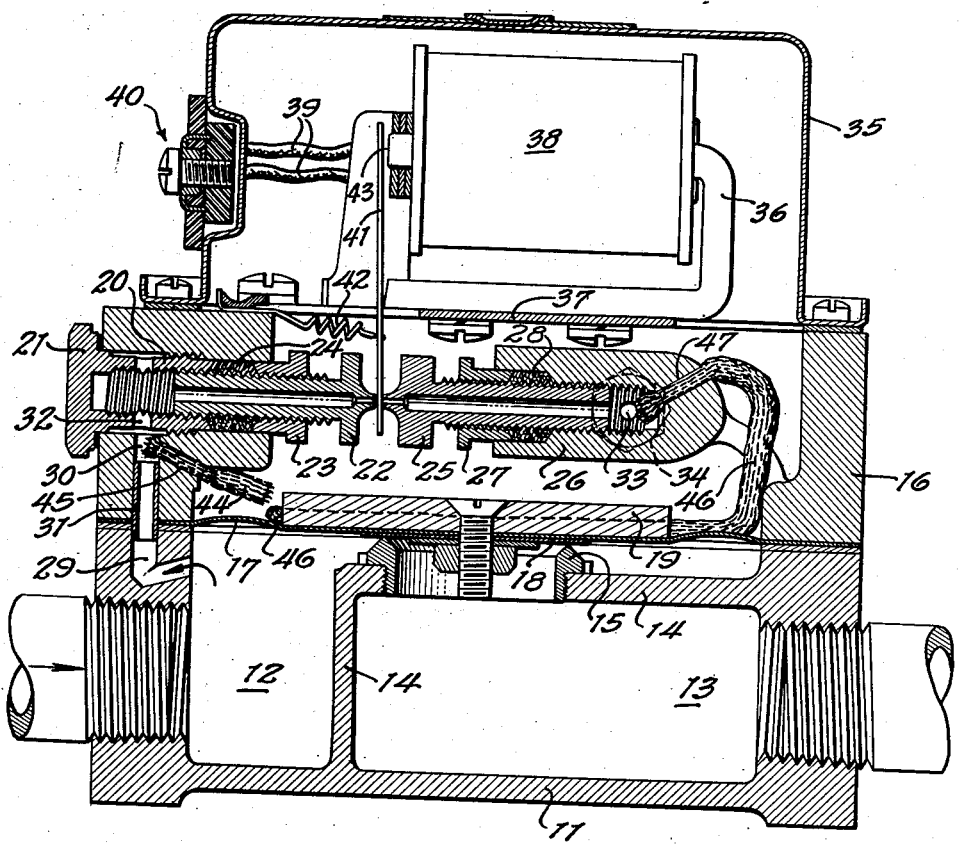
Inventor,
WILLIAM A. RAY
By John H. Rouse,
Attorney Patented June 1, 1954

2,679,855

UNITED STATES PATENT OFFICE 2,679,855

VALVE-SCAVENGING MEANS

William A. Ray, North Hollywood, Calif., assignor to General Controls Co., Glendale, Calif., a corporation of California Application June 19, 1950, Serial No. 168,926

6 Claims. (Cl. 137—177)

My present invention relates to valves for controlling flow of gases, as contrasted with liquids, and has particular utility in connection with the control of ordinary fuel gases, of the "artificial" or "manufactured" types, supplied by the service lines.

Such fuel gases usually carry small amounts of oils or other liquids, normally in colloidal or near-colloidal suspension, which tend to precipitate in a valve, especially when the same is closed.

When the valve is of the type operated by the pressure of the gas and includes a pilot valve having restricted passageways or ports, the precipitated liquid may obstruct these passageways and thereby cause failure of operation. Further, the liquid may accumulate on the flexible diaphragm, usually employed in that type of valve, in an amount such that its weight on the diaphragm interferes with the operation of the valve.

In view of the foregoing it is an object of this invention to provide a gas valve having means for absorbing, and/or removing from the valve, liquid particles carried in suspension by the gas.

For full understanding of the invention, and further appreciation of its features and advantages, reference is to be had to the following detailed description and accompanying drawing, and to the appended claims.

The single figure of the drawing is a sectional view of a pressure-operated diaphragm valve embodying the invention.

In the drawing, the numeral 11 indicates a valve casing having an inlet 12 and an outlet 13 separated by a right-angled partition 14; a hollow valve-seat member 15 being threaded in an opening through the horizontal part of the partition. Secured to the open top of casing 11 is a hollow upper section 16, and clamped at its margin between these parts is a flexible diaphragm 17 of leather or synthetic rubber. On the underside of diaphragm 17 at its center is a closure disk 18 which is normally held in valve-closing engagement with the seat member 15 by the weight of a plate 19 carried by the diaphragm.

Threaded in an opening through a thickened portion of the left side-wall of the upper section 16 is a hollow fitting 20 whose head portion 21 closes the opening at its outer end. Threaded in the fitting 20 is an elongated jet member 22 which is clamped in adjusted position by a gland 23 and packing 24. Aligned with the jet member 22 is an opposed jet member 25 which is threaded in an opening in a portion 26 extending integrally from the back wall of casing section 16; a gland 27 and packing 28 clamping jet member 25 in position.

The jet member 22 is in communication with the inlet 12 of the valve by way of an angled passage 29 in casing 11, vertical passage 30 in upper section 16 (a tube 31 facilitating alignment of the adjoining ends of passages 29 and 30 in assembly, and preventing obstruction of the openings by diaphragm 17), and transverse openings 32 in fitting 20 wherein jet member 22 is mounted. The jet member 25 communicates with the exterior of the valve casing by way of a vent opening 33 in the portion 26; a fitting 34 being provided at the back of the valve for connection of the usual vent pipe.

Mounted within a housing 35 covering the open top of casing section 16 is an electromagnet which comprises a U-shaped core 36, secured to an apertured plate 37 interposed at its margin between section 16 and the flange of housing 35, having around its upper side-arm an energizing coil 38 whose leads 39 extend to terminals 40 at the side of the housing. Fulcrumed on the end of the lower side-arm of core 36 is an armature-closure 41 whose lower portion extends between the tips of jet members 22 and 25 to serve as a closure therefor. The armature-closure 41 is biased in a counterclockwise direction by a compression spring 42 into engagement with jet 25 and is movable in a direction away from the same, into engagement with jet 22, when the electromagnet is energized and the upper end of the armature consequently attracted toward the pole-face 43.

The three-way pilot valve constituted by jets 22 and 25 and the armature-closure 41 serves to control the movement of diaphragm 17, and consequently the seating and unseating of the main closure disk 18, in the following manner: When the electromagnet is unenergized and jet 22 uncovered, as shown, the space above the diaphragm is subjected to the same gas pressure as exists in inlet 12 (jet 22 being in communication with inlet 12, as previously described) so that the diaphragm is maintained in depressed position by the weight of plate 19. When, upon energization of the electromagnet, the armature-closure 41 is attracted out of engagement with jet 25 and into engagement with jet 22, the gas compressed in the space above the diaphragm passes to the atmosphere by way of vent opening 33; the diaphragm then rising under the pressure of the gas below it so that seat member 15 is uncovered and gas passes to the main outlet 13. When the electromagnet is subsequently deenergized, gas passes through the then-open jet 22 to effect equalization of the gas pressures above and below the diaphragm, so that the same falls and thereby obstructs flow to the main outlet. The structure so far described is more-or-less conventional.

For accomplishing the objects of the present invention I provide a wick 44 having a portion normally spaced a short distance above the diaphragm 17 (so that it engages the diaphragm when the same rises in the opening of the valve) and another portion extending through an opening 45 into the passage 30 which leads to the pilot-valve jet 22. I also provide another wick 46 whose lower portion rests on the diaphragm around the periphery of plate 19; the upper end of this wick extending through an opening 47 in portion 26 to a point adjacent the vent opening 33 so that it is in the path of gas escaping through jet 25 when the electromagnet is energized.

The wicks 44 and 46 may be of conventional liquid-absorbent material and are of such size in relation to the openings 45 and 47 that they form substantially gas-tight packings therein.

The wick 44, being in the path of gas passing to the pilot valve each time the electromagnet is deenergized, serves to pick-up liquid particles from the gas so that the possibility of obstruction of the restricted passageways of jet 22 is minimized. Liquid particles precipitated from the gas in opening 30 when the flow of gas therethrough ceases are also absorbed by this wick. The liquid absorbed by the upper portion of wick 44 passes by gravity and by capillary attraction to the diaphragm chamber. The wick 46 serves to absorb liquid as it is deposited on the diaphragm and to transfer it by capillary attraction to a point adjacent the vent opening 33 whence it is carried away by the venting gas.

The specific embodiment of my invention herein shown and described is obviously susceptible of modification without departing from the spirit of the invention, and I intend therefore to be limited only by the scope of the appended claims.

I claim as my invention:

1. In a valve for controlling flow of a mixture comprising fuel gas and foreign matter in the form of particles of liquid carried by the gas and which tend to deposit in the valve: a valve structure having a main inlet and a main outlet and means for controlling flow of said mixture therebetween, said structure having also a restricted passageway communicating with said main inlet for supplemental flow through the structure; and wick-like means, capable of absorbing said liquid but substantially impermeable by the gas, having a first portion disposed generally in the path of the mixture flowing from said main inlet toward said restricted passageway, said first portion being so arranged in said path as to provide space for flow about it to the restricted passageway; said wick-like means having also another portion extending so as to transfer absorbed liquid to a part of the structure where the liquid cannot interfere with flow through the restricted passageway.

2. In a valve for controlling flow of a mixture comprising fuel gas and foreign matter in the form of particles of liquid carried by the gas and which tend to deposit in the valve: a valve structure having an inlet and an outlet and means for controlling flow of said mixture therebetween; means operated by the pressure of said mixture for actuating said flow-controlling means, and including a flexible diaphragm having a surface exposed to the mixture and on which surface said liquid tends to deposit; and wick-like means having a portion in engagement with said diaphragm-surface for absorbing liquid deposited thereon, said wick-like means extending so as to transfer absorbed liquid to a part of the structure where the liquid cannot interfere with the operation of the valve.

3. In a valve for controlling flow of a mixture comprising fuel gas and foreign matter in the form of particles of liquid carried by the gas and which tend to deposit in the valve: a valve structure having a main inlet and a main outlet and means for controlling flow of said mixture therebetween; means operated by the pressure of the gaseous content of said mixture for actuating said flow-controlling means; a pilot valve for controlling said pressure-operated means and communicating with said main inlet; and wick-like means, capable of absorbing said liquid but substantially impermeable by the gas, having a first portion disposed generally in the path of the mixture flowing from said main inlet toward said pilot valve, said first portion being so arranged in said path as to provide space for flow about it to the pilot valve; said wick-like means having also another portion extending so as to transfer absorbed liquid to a part of the structure where the liquid cannot interfere with the operation of the pilot valve.

4. In a valve for controlling flow of a mixture comprising fuel gas and foreign matter in the form of particles of liquid carried by the gas and which tend to deposit in the valve: a valve structure having a main inlet and a main outlet and means for controlling flow of said mixture therebetween; means operated by the pressure of the gaseous component of said mixture for actuating said flow-controlling means; a pilot valve for controlling said pressure operated means and having an inlet port communicating with said main inlet, and an outlet port; and wick-like means, capable of absorbing said liquid but substantially impermeable by the gas, arranged so as to form a by-pass between said ports for said liquid; the portion of said wick-like means at the inlet-port end of said by-pass being so arranged in the path of the mixture flowing toward the inlet port as to provide space for flow about the portion to the inlet port.

5. In a valve for controlling flow of a mixture comprising fuel gas and foreign matter in the form of particles of liquid carried by the gas and which tend to deposit in the valve: a valve structure having a main inlet and a main outlet and means for controlling flow of said mixture therebetween; means operated by the pressure of said mixture for actuating said flow-controlling means, and including a flexible diaphragm having a surface exposed to the mixture and on which surface said liquid tends to deposit; a pilot valve for controlling said pressure operated means and having an outlet port; and wick-like means, capable of absorbing said liquid but substantially impermeable by the gas, having one portion in engagement with said diaphragm-surface for absorbing liquid deposited thereon, and another portion extending into said outlet port.

6. In a valve for controlling flow of a mixture comprising fuel gas and foreign matter in the form of particles of liquid carried by the gas and which tend to deposit in the valve: a valve structure having a main inlet and a main outlet and means for controlling flow of said mixture therebetween; means operated by the pressure of said mixture for actuating said flow-controlling means, and including a flexible diaphragm having a surface exposed to the mixture and on which surface said liquid tends to deposit; a pilot valve for controlling said pressure operated means and having an inlet port communicating with said main inlet, and an outlet port; and wick-like means, capable of absorbing said liquid but substantially impermeable by the gas, arranged so as to form a by-pass between said ports for said liquid, the portion of said wick-like means at the inlet-port end of said by-pass being so arranged in the path of the mixture flowing toward the inlet port as to provide space for flow about the portion to the inlet port; a portion of the wick-like means intermediate the ports being in engagement with said diaphragm-surface for absorbing liquid deposited thereon.

References Cited in the file of this patent

UNITED STATES PATENTS

| Number | Name | Date |
|---|---|---|
| 702,353 | Atkins | June 10, 1902 |
| 1,010,247 | Frederick | Nov. 28, 1911 |
| 1,337,020 | Milker | Apr. 13, 1920 |
| 1,429,713 | Cazier | Sept. 19, 1922 |
| 1,452,204 | Luetscher | Apr. 17, 1923 |
| 1,512,358 | Neill | Oct. 21, 1924 |
| 1,805,658 | Farmer | May 9, 1931 |
| 1,887,606 | Thomas | Nov. 15, 1932 |
| 2,102,076 | Johnson | Dec. 14, 1937 |
| 2,119,958 | Newill | June 7, 1938 |
| 2,144,393 | Schnaier | Jan. 14, 1939 |
| 2,292,477 | Ray | Aug. 11, 1942 |
| 2,319,756 | Swan | May 18, 1943 |